United States Patent [19]

Peter et al.

[11] Patent Number: 5,093,459
[45] Date of Patent: Mar. 3, 1992

[54] BISMALEIMIDE RESIN CONTAINING UNREACTED MONOMER REACTANTS

[75] Inventors: Roland Peter, Mutterstadt; Philipp Eisenbarth, Bad Durkheim; Lothar Schlemmer, Maxdorf, all of Fed. Rep. of Germany

[73] Assignee: BASF Aktiengesellschaft, Ludwigshafen, Fed. Rep. of Germany

[21] Appl. No.: 550,278

[22] Filed: Jul. 9, 1990

[30] Foreign Application Priority Data

Jul. 27, 1989 [DE] Fed. Rep. of Germany ....... 3924867

[51] Int. Cl.$^5$ ............................................. C08G 73/12

[52] U.S. Cl. .................................. 528/170; 528/117; 528/120; 528/123; 528/321; 528/322

[58] Field of Search ............... 528/170, 322, 321, 117, 528/120, 123

[56] References Cited

FOREIGN PATENT DOCUMENTS 3604872 8/1987 Fed. Rep. of Germany.

Primary Examiner—Harold D. Anderson
Attorney, Agent, or Firm—William G. Conger

[57] ABSTRACT

Solid, fusible bismaleimide resins formed from a mixture of a bismaleimide and an aminophenol still contain from 70 to 90 mol % of unconverted bismaleimide and from 30 to 60 mol % of unconverted aminophenol.

15 Claims, No Drawings

BISMALEIMIDE RESIN CONTAINING UNREACTED MONOMER REACTANTS

The present invention relates to a solid, fusible bismaleimide resin formed from a bismaleimide and an aminophenol which have reacted to the prepolymer stage.

Bismaleimide resins formed from bismaleimides and aminophenols are known. They are suitable for manufacturing shaped articles by mixing with reinforcing fibers, pressing and curing.

According to JP-A-56 014 530 and DE-A-2 728 843 (U.S. Pat. No. 4,128,598), bismaleimide and aminophenol are mixed with one another at from 100° to 130° C. to form an addition product (a prepolymer). The lower limit is 100° C. because even after 1 hour no significant amount of prepolymer has formed, since the temperature is below the melting points of the two starting materials. At 130° C., the reaction has gone so far that the melt has become very viscous and is on the point of gelling, which precludes safe manufacture of the resin on an industrial scale.

EP-A 237 763 describes a process for preparing prepregs by first heating a mixture of bismaleimide and an aminophenol and then applying the reaction product in melt form to reinforcing fibers. In the Example, the reaction was carried out at 180° C. At that temperature the reaction proceeds to such an extent that wetting of the fibers presents a problem, in particular in the case of dense fibrous structures, eg. woven fabrics, so that the composites produced therewith are defective.

DE-A-3 510 529 (GB 2 156 369) and DE-A-3 600 740 (U.S. Pat. No. 4,680,377) describe polyimide prepolymers prepared by reacting a bismaleimide with a diamine in a high-boiling polar solvent, eg. N-methylpyrrolidone. The reaction is to be carried on until the mixture still contains 30-40% or 41-55% of unconverted reactants. The references advise against a reaction in the melt since an excessively high proportion of prepolymer having an undesirably high molecular weight is then formed. The solution obtained is used directly for impregnating reinforcing fibers. This has the disadvantage that the prepolymer must be used straight away. In addition, the removal of considerable amounts of high-boiling solvents, as would be necessary for use as an encapsulating composition, is always problematical and uneconomical.

It is an object of the present invention to provide a storable bismaleimide resin in solid form of optimal viscosity for impregnating or mixing with reinforcing fibers, so that shaped articles having excellent mechanical properties can be produced therefrom by pressing and curing.

We have found that this object is achieved according to the present invention by a bismaleimide/aminophenol reaction product where from 70 to 90 mol %, preferably from 75 to 85 mol %, of component A and from 30 to 60 mol %, preferably from 35 to 55 mol %, of component B are present in unconverted form and the remainder as prepolymer.

The present invention accordingly provides a solid, fusible bismaleimide resin prepared by mixing A. a bismaleimide of the formula

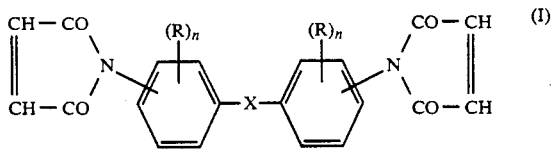

where
X is $CH_2$, O or $SO_2$,
R is $C_1$-$C_4$-alkyl and
n is 0, 1 or 2, and

B. an aminophenol of the formula

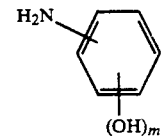

in a molar ratio of A:B from 2.4:1 to 1 4:1, A and B reacting to form a prepolymer, with or without C. from 0 to 2% by weight, based on A+B, of a secondary or tertiary amine or phosphine as additional catalyst,
D. from 0 to 1% by weight, based on A+B, of a polymerization inhibitor,
E. from 0 to 25% by weight, based on A+B, of a copolymerizable vinyl or allyl compound,
F. from 0 to 25% by weight, based on A+B, of an epoxy resin containing at least 2 epoxy groups, and
G. from 0 to 2% by weight, based on A+B, of a peroxide initiator, wherein from 70 to 90 mol %, preferably from 75 to 85 mol %, of component A a nd from 30 to 60 mol %, preferably from 35 to 55 mol %, of component B are present in unconverted form and the remainder as prepolymer.

There now follow observations concerning the materials used:

A. Bismaleimides of the formula I are known, for example from DE-A-20 40 094, DE-A-27 19 903 and DE-A-32 47 058. Preference is given to 4,4'methylenebis(N-phenylmaleimide). Besides bismaleimides it is basically also possible to us trisand tetramaleimides and also mixtures of various bismaleimides, including aliphatic ones.

B. Suitable aminophenols are m-, o- and p-aminophenol, of which m-aminophenol is preferred. The molar ratio of A:B ranges from 2.4:1 to 1.4:1, preferably from 2.0:1 to 1.5:1, in particular from 1.8:1 to 1.6:1. We have found, surprisingly, that the last-mentioned range gives rise to an optimum in respect of the mechanical properties, such as strength and impact toughness, and also in respect of heat resistance.

C. Suitable catalysts for addition reaction of the aminophenol to a double bond of the bismaleimide are up to 2.0, preferably from 0.2 to 1.5,% by weight, based on the sum of A+B, of a secondary or tertiary amine or phosphine. Preferred amines are those of the general formula $N(R_5)_3$ and $(R_6)_2N$-$R_7$-$N(R_6)_2$, where $R_5$, $R_6$ and $R_7$ may be substituted or unsubstituted aliphatic or aromatic hydrocarbon radicals or a hydrocarbon bridge. Preferred amines are N,N,N',N'-tetramethyl-diaminodiphenylmethane, N,N-dimethyl-aniline and dimethylbenzylamine but also imidazoles, eg. 1- methylimidazole. The preferred phosphine is triphenylphosphine.

D. The inhibitors used for inhibiting the premature free radical polymerization of the double bond of the bismaleimide are customary, preferably phenolic, compounds, in particular hydroquinone or 2,6-dimethylhydroquinone, in amounts of up to 1, preferably from 0.1 to 0.5,% by weight, based on the sum of A+B.

A suitable choice of type and amount of addition catalysts C and inhibitors D makes it possible to adjust the reactivity of the mixture A+B in a controlled manner, so that the reaction of bismaleimide with aminophenol takes place sufficiently rapidly at elevated temperatures without undesirable crosslinking and that undesirable crosslinking does not occur either during application in the melt form to the reinforcing fibers or in the processing of the prepreg.

E. The vinyl or allyl compounds which are admixed in amounts of up to 25, preferably from 5 to 20,% by weight, based on the sum of A+B, are copolymerized into the resin matrix a copolymers in the course of the curing of the prepreg. They act as diluents to reduce the resin viscosity, but properly chosen in terms of type and amount they make it possible, especially in the form of mixtures, to adjust the tackiness of the prepreg in a controlled manner and to reduce the softening temperature of the impregnating resin to room temperature. Preference is given to monomers having two or three vinyl or allyl groups. It is possible to use, for example, N-vinylpyrrolidone, N-vinylcarbazole, divinylbenzene, acrylates, diallyl ether, ethoxylated bisphenol A methacrylate, 3,3'-diallylbisphenol A, 3,3'-dipropenylbisphenol A, also reaction products of a diepoxide with acrylic acid or methacrylic acid, but in particular diallyl phthalate or prepolymers produced therefrom, triallyl cyanurate and triallyl isocyanurate.

F. Customary epoxy resins in amounts of up to 25, preferably from 5 to 20,% by weight, based on A+B, can likewise act as reactive diluents which are incorporated in the resin matrix.

G. The peroxide polymerization initiators which may be added in amounts of from 0 to 2, preferably from 0.01 to 2,% by weight, based on the sum of A+B, to speed up the process of curing are of a customary type which decompose at above 140° C. into free radicals.

The mixture is heated to 140°–190° C., preferably 150°–180° C., the components melt, and the bismaleimide and the aminophenol react with each other. The residence time of the reactants at these temperatures should be comparatively short, preferably from 1 to 10, in particular from 2 to 4, min. It is possible to start from a premix of pulverulent or granular starting materials and heat it to the reaction temperature, for example in a stirred vessel. Preferably, however, the starting materials are mixed in an extruder, advantageously first by introducing and melting the bismaleimide and then adding the aminophenol through a feed opening which is downstream in the discharge direction. The reaction is carried on until the bismaleimide resin formed is left with from 70 to 90 mol % of component A and from 30 to 60 mol % of component B in unconverted form. The degree of conversion can be controlled in a simple manner via the reaction temperature, the reaction time and, if used, via the identity and amount of the addition catalyst. The progress of the reaction can be monitored by rapidly cooling and analyzing the unconverted starting components A+B. The technique employed for the quantitative determination of A+B in the resin mixture is high pressure liquid chromatography (HPLC) following prior calibration of the retention times and areas with pure A and B. In this way it is a simple matter to determine the best reaction conditions for the particular system. After the reaction has ended, the melt is cooled down rapidly. The resin can be granulated, chipped or pulverized. In this form it has a virtually unlimited shelf life.

For use, it can be re-melted and mixed with further additives, for example fibers or fillers. It is also possible, in principle, to dissolve the resin in a low-boiling solvent, for example an ether or ester, and to apply it to reinforcing fibers in the form of a solution. Such low-boiling solvents, eg. methylglycol acetate or methoxypropyl acetate, have the advantage over high-boiling solvents, such as N-methylpyrrolidone, that they can be removed again from the prepreg under significantly gentler conditions.

If the resin mixture is mixed with short fibers, the result is a bulk molding compound which can be for example injection molded and then cured.

If the resin mixture is applied to fiber mats, the result is a moldable and curable semi-finished product which corresponds to a sheet molding compound.

The resin mixture can also be applied to unidirectionally laid fabrics or to bundles of continuous filaments. Such prepregs can then be shaped and cured into high-performance composites.

Finally, the resins according to the present invention can also be processed without fibers into surface coatings and encapsulating and potting compositions.

The cure is effected by heating to 160°–300° C., preferably 180°–250° C. The resulting materials have excellent mechanical and thermal properties and can be used in particular in the automotive industry, electronics and aerospace.

EXAMPLE 1

In a 1-1 four-necked flask equipped with a stirrer, an internal thermometer and a nitrogen inlet, 425 g (1.19 mol) of N,N'-4,4'-bismaleimidodiphenylmethane (BMI) are melted at 170° C. and admixed with 75 g (0.69 mol) of 3-aminophenyl (AP) at 160° C. The mixture is stirred for 4 minutes until completely homogeneous and is then poured out and cooled in an ice bath. The clear resin is analyzed by HPLC for unconverted amounts of starting materials, and its glass transition temperature is determined (by DSC) as are its melt viscosity and gel time. The results are summarized in the table.

EXAMPLE 2

In a twin-screw extruder, a mixture of 85 parts of N,N'-4,4'-bismaleimidodiphenylmethane and 15 parts of 3-aminophenol is melted and incipiently reacted at 180° C. The product is analyzed as described in Example 1 (table).

EXAMPLE 3 (comparison)

85 g (0.24 mol) of N,N,-4,4'-bismaleimidodiphenylmethane and 15 g (0.14 mol) of 3-aminophenol are stirred at 130° C. After half an hour at that temperature, the initially pulverulent mixture is turned into a homogeneous melt, which is poured out, cooled and then analyzed (table).

| Example | Reaction time (min) | Reaction temperature (°C.) | Composition unconverted BMI (mol %) | Composition unconverted AP (mol %) | Glass transition temperature DSC (°C.) | Melt viscosity 150° C. (mPas) | Gel time at 150° C. (min) |
| --- | --- | --- | --- | --- | --- | --- | --- |
| 1 | 4 | 160 | 84.5 | 53.3 | 38 | 40 | 12'20" |
| 2 | 2 | 180 | 88.0 | 47.3 | — | 300 | 12'05" |
| 3 | 30 | 130 | 69.3 | 21.3 | 68 | 3800 | <5' |

We claim:

1. A solid, fusible bismaleimide resin composition produced from the reaction of
   A. a bismaleimide of the formula

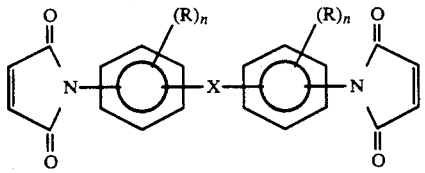

wherein
   X is $CH_2$, O, or $SO_2$,
   R is $C_1$-$C_4$ alkyl, and
   n is 0, 1, or 2, with
   B. an aminophenol of the formula

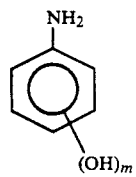

wherein m is 1 or 2;
   wherein A and B are present in a molar ratio of from 2.4:1 to 1.4:1, and react in part to form a prepolymer such that from 70 to 90 mole percent A based on the mole of A in said mixture and from 30 to 60 mole percent B based on the moles of B in said mixture remain unreacted.

2. The resin composition of claim 1 wherein A and B react in the presence of
   C. an effective amount up to 2% by weight based on the weight of A and B of a secondary or tertiary amine catalyst.

3. The resin composition of claim 1 wherein A and B react in the presence of
   D. and effective amount up to 1% by weight based on the weight of A and B of a polymerization inhibitor.

4. The resin composition of claim 2 wherein A and B react in the presence of
   D. an effective amount up to 1% by weight based on the weight of A and B of a polymerization inhibitor.

5. The resin composition of claim 1 further comprising
   E. up to about 25% by weight based on the weight of A and B of a copolymerizable vinyl or allyl compound.

6. The resin composition of claim 2 further comprising
   E. up to about 25% by weight based on the weight of A and B of a copolymerizable vinyl or allyl compound.

7. The resin composition of claim 3 further comprising
   E. up to about 25% by weight based on the weight of A and B of a copolymerizable vinyl or allyl compound.

8. The resin composition of claim 4 further comprising
   E. up to about 25% by weight based on the weight of A and B of a copolymerizable vinyl or allyl compound.

9. The resin composition of claim 2 wherein said effective amount up to 2% by weight of secondary amine or tertiary amine catalyst further includes an effective amount of a phosphine catalyst.

10. The resin composition of claim 3 wherein said effective amount up to 2% by weight of secondary amine or tertiary amine catalyst further includes an effective amount of phosphine catalyst.

11. The resin composition of claim 4 wherein said effective amount up to 2% by weight of secondary amine or tertiary amine catalyst further includes an effective amount of a phosphine catalyst.

12. The resin composition of claim 5 wherein said effective amount up to 2% by weight of secondary amine or tertiary amine catalyst further includes an effective amount of a phosphine catalyst.

13. The resin composition of claim 6 wherein said effective amount up to 2% by weight of secondary amine or tertiary amine catalyst further includes an effective amount of a phosphine catalyst.

14. The resin composition of claim 7 wherein said effective amount up to 2% by weight of secondary amine or tertiary amine catalyst further includes an effective amount of a phosphine catalyst.

15. The resin composition of claim 8 wherein said effective amount up to 2% by weight of secondary amine or tertiary amine catalyst further includes an effective amount of a phosphine catalyst.

* * * * *